March 20, 1962 R. V. MUFFLEY 3,025,710

POSITIONING DEVICE

Filed Sept. 24, 1956 5 Sheets-Sheet 1

INVENTOR.
ROBERT V. MUFFLEY
BY John B. Clark
ATTORNEY

March 20, 1962 R. V. MUFFLEY 3,025,710

POSITIONING DEVICE

Filed Sept. 24, 1956 5 Sheets-Sheet 4

United States Patent Office 3,025,710

Patented Mar. 20, 1962

3,025,710

POSITIONING DEVICE

Robert V. Muffley, Los Altos, Calif., assignor to International Business Machines Corporation, New York, N.Y., a corporation of New York Filed Sept. 24, 1956, Ser. No. 611,622
5 Claims. (Cl. 74—91)

The present invention relates generally to positioning mechanisms and pertains more particularly to a device for positioning magnetic transducers at selected tracks of magnetic records.

Generally, the present invention is directed to a novel access mechanism for accurately positioning a transducer or the like at selected portions of a recording medium according to predetermined instructions. When it is desired to position a transducer randomly at selected recording tracks of a magnetic record, the track density, i.e., the number of tracks per unit width of the record, is limited by the accuracy of the positioning mechanism as well as by the magnetic characteristics of the transducer and record. At the present time, the positioning mechanism is the primary limiting factor.

Thus, one object of the present invention is to provide an improved positioning device.

Another object is to provide a device for accurately positioning a magnetic transducer at selected tracks of a magnetic record.

To permit independent positioning of transducers where a large number of transducers are involved, the cost of the positioning mechanism must be maintained at a reasonable figure without sacrificing accuracy.

A further object, therefore, is to provide a relatively inexpensive positioning mechanism having a high degree of accuracy.

Additionally, it is desirable to maintain access time, i.e., the time to position a transducer at a selected track, at a minimum and for this reason the positioning mechanism of the invention is provided with a novel control circuit for minimizing the access time. According to the invention, the positioning mechanism includes an escapement device and the novel control circuit is arranged to control the length of successive escapements according to the distance the transducer is to be moved.

Thus, another object is to provide a high-speed positioning mechanism.

Still another object is to provide a positioning mechanism including an escapement device wherein the length of successive escapements is determined according to the distance to be moved.

Other objects of the invention will be pointed out in the following description and claims and illustrated in the accompanying drawings, which disclose, by way of example, the principle of the invention and the best mode which has been contemplated of applying that principle.

Figure 7A:
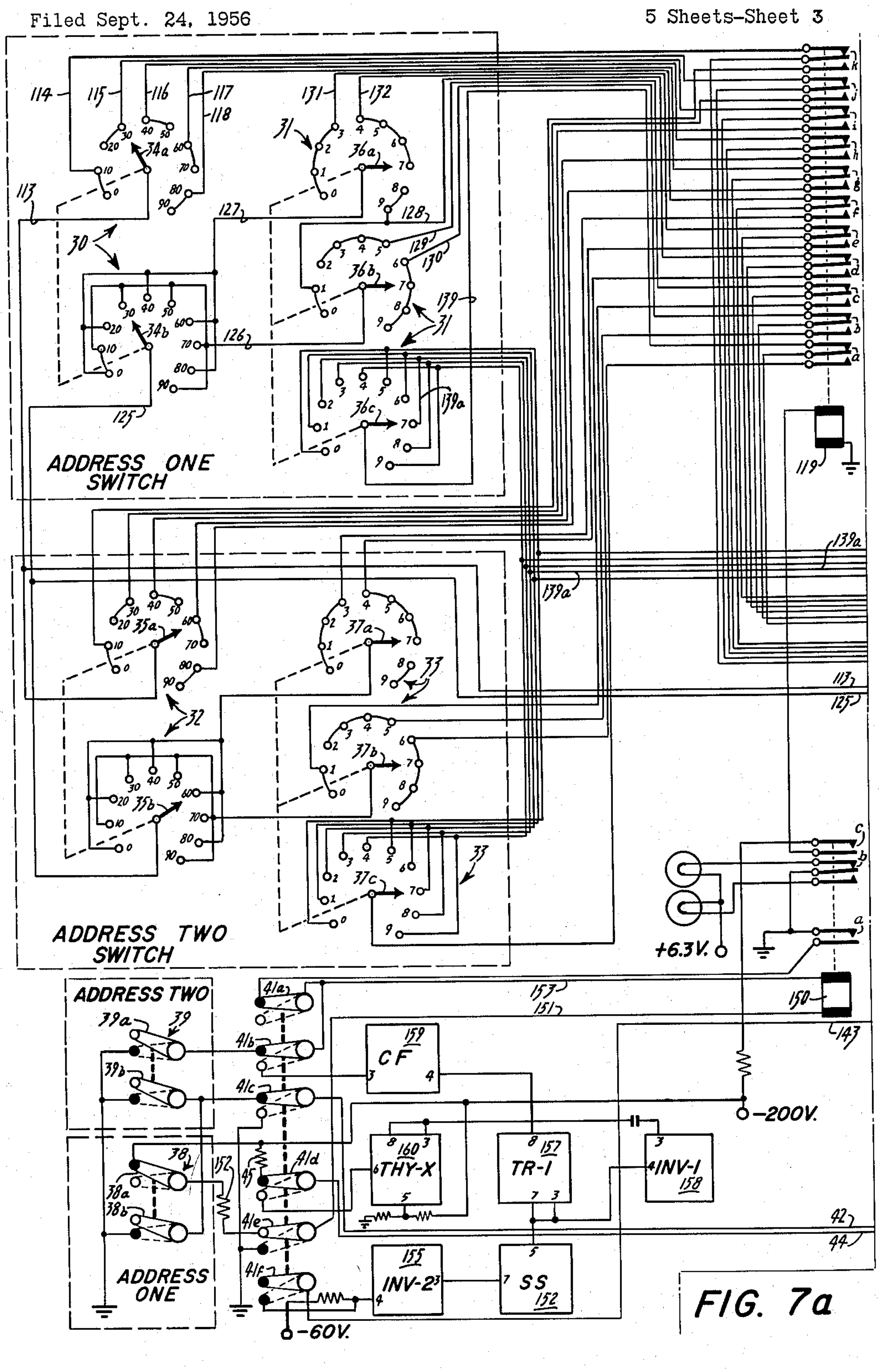
Figure 7B:
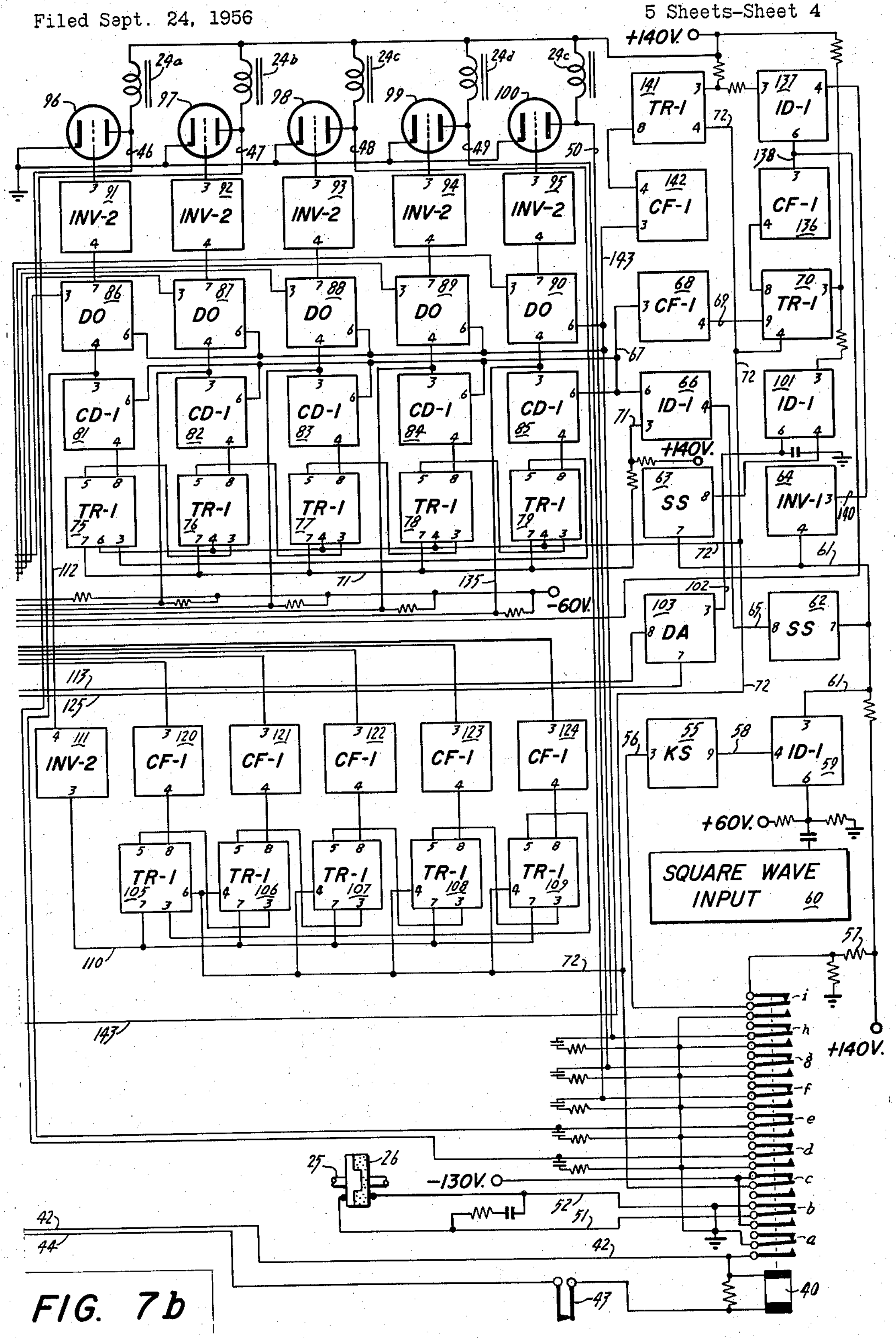

FIGS. 7*a* and 7*b* comprise a schematic diagram of the control circuits of the invention.

FIGS. 8 through 17 comprise detailed schematic diagrams of the electronic components disclosed in block form in FIG. 7.

Figure 1:
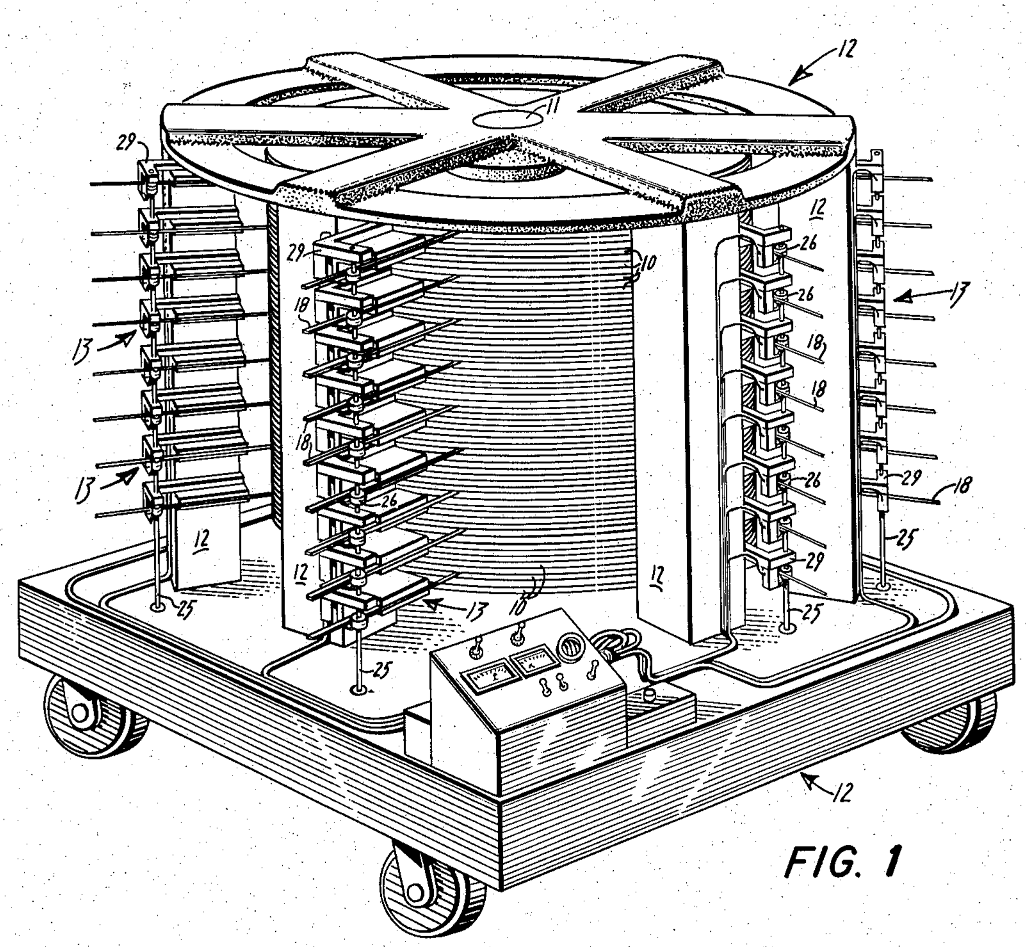
FIG. 1 is a perspective view of a storage device provided with the positioning mechanism of the invention.
Figure 2:
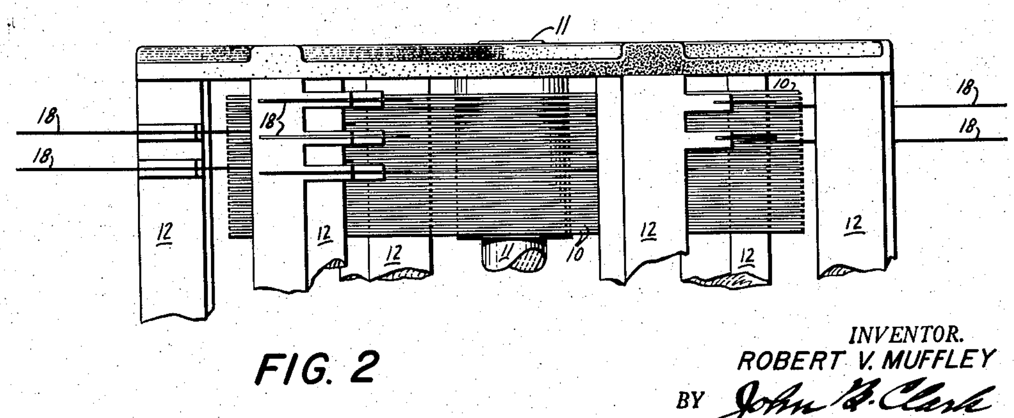
FIG. 2 is a partial elevation of the device shown in FIG. 1.

Referring now to FIG. 1, the storage unit there shown comprises a plurality of magnetic discs 10 supported for rotation upon a common shaft 11 journaled in suitable bearings provided therefor in a support frame generally referred to by the reference numeral 12. Also supported by the frame 12 are a plurality of positioning mechanisms 13 of the invention, provided for positioning corresponding magnetic transducers 14 and 15 (FIG. 3) adjacent selected concentric tracks on the associated faces of the discs 10. The transducers are supported by arms 16 and 17, respectively, which are affixed to a rack 18 and are disposed between adjacent discs in such a way that one transducer cooperates with the lower face of the upper disc and the other cooperates with the upper face of the lower disc.

The rack 18 includes a plurality of pawl-engaging teeth 19 disposed along one side thereof, and a plurality of teeth 20 disposed along the other side are provided to mesh with the teeth of a gear 21. The teeth 19 in the present embodiment are spaced five "tracks" apart, i.e., the distance A (FIG. 6) is equal to five times the center-to-center spacing between adjacent tracks. Five pawls 22 are provided for selectively engaging the teeth 19, as will be more fully described hereinafter, which pawls are spaced six "tracks" apart. For the more general case, therefore, the pawl-engaging teeth 19 are spaced apart by a distance $n \times s$ where $n$ equals the number of pawls and $s$ equals the track-to-track spacing. Accordingly, the pawls are spaced apart by a distance equal to $n \times s + s$ or equal to $s(n+1)$. Each pawl is biased into engagement with the rack 18 by a corresponding spring 23 (FIG. 3) and solenoids 24 are provided for retracting the corresponding pawls clear of the rack (see FIG. 5).

Figures 3, 4, 5, 6:
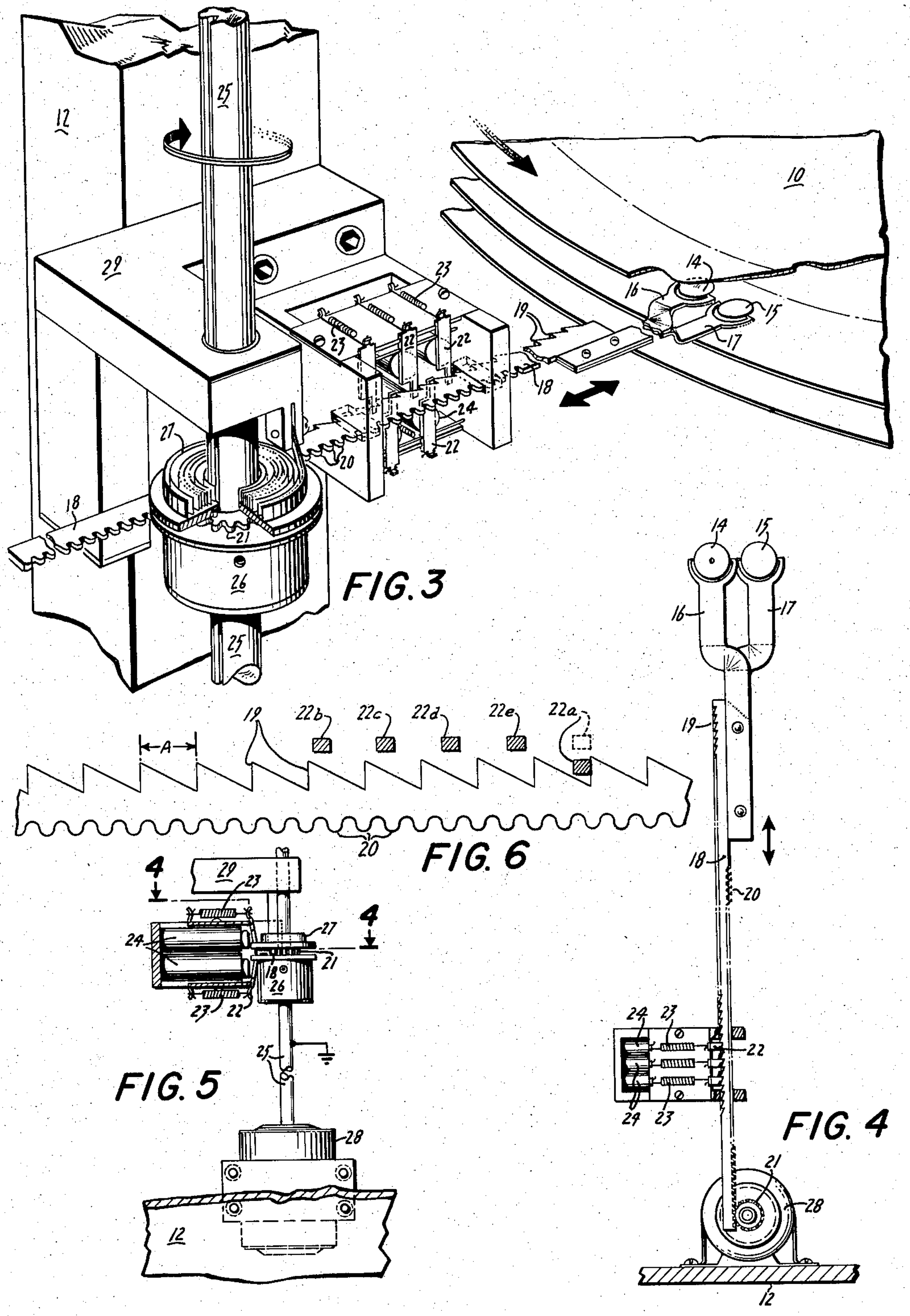
FIG. 3 is an enlarged, partial perspective view of a portion of FIG. 1, showing the positioning mechanism of the invention in detail.
FIG. 4 is a sectional view taken along line 4—4 of FIG. 5.
FIG. 5 is a partial elevation of the positioning mechanism.
FIG. 6 is an enlarged pictorial representation of the rack and pawl arrangement of the invention.

The gear 21 is driven in a clockwise direction, as viewed in FIG. 3, by a shaft 25 through a suitable magnetic clutch 26, the gear 21 being affixed to the driven member of the clutch. Additionally, the gear is driven in the other direction at the appropriate times by a suitable coil spring 27. The shaft 25 and the drive member of the clutch 26 are continuously driven by a motor 28 (FIG. 5) in a direction which drives the rack toward the discs 10 when the clutch 26 is engaged, and the spring 27 is arranged to retract the rack in the opposite direction, away from the discs, under control of the pawls 22. One end of the coil spring 27 (FIG. 3) is pinned to an L-bracket 29 which is secured to the frame 12, the other end of the spring being secured to the shaft 25. When in operation, the motor 28 drives the rack to its home position, i.e., to its innermost position between the discs, and the spring is arranged to retract the rack under the control of the solenoids 24 and their corresponding pawls 22. It should be noted that each shaft 25 (see FIG. 1) cooperates with a plurality of clutches 26 and racks 18 in the storage device there shown.

Referring now to FIG. 6, the rack 18 is shown in a position in which the pawl **22*a* engages a tooth of the rack to maintain it in this position against the tension of the spring 27. Under these conditions, the solenoids 24 associated with pawls 22*b*, 22*c*, 22*d* and 22*e* are energized to maintain these pawls clear of the rack, and the solenoid associated with pawl 22*a* is deenergized. If the pawls are successively picked in the order 22*a*, 22*b* through 22*e*, etc., and are successively released in the order 22*b*, 22*c* through 22*a*, etc., the rack will escape four tracks at a time, i.e., a distance equal to $s(n-1)$. This is true since, as mentioned previously, the rack teeth are spaced five tracks apart and the pawls are spaced six tracks apart. If, however, the solenoids 24 are operated in the opposite order, i.e., 24*a*, 24*e*, 24*d*, 24*c*, 24*b***, etc., the rack will escape one track at a time, i.e., a distance equal to *s*. Similarly, if the solenoid 24a is energized and the solenoid 24d is deenergized, the rack escapes two tracks, etc. These methods of operation are utilized in a cumulative manner to position the transducers at selected tracks. Where the transducer is to be moved an increment of four tracks or more, the solenoids are actuated by the control mechanism to be described to engage the pawls in the sequence 22a, 22b, etc., whereas when less than a four-track increment is involved the pawls are not engaged in this sequence. This will be more fully explained in connection with the description of the control circuitry.

Various electronic components utilized in the control circuitry of the invention are shown in the drawings merely as blocks which have been labeled to indicate the type of component represented thereby. The detailed circuitry of each such bock is shown in the corresponding FIGURE 8 through 17 of the drawings. Each of the letter designations shown in the blocks denotes the function of the component in addition to acting as a reference to the detailed circuitry, and it follows that cathode followers are labeled with the letters CF; similarly, inverters are labeled with the letters INV and single-shot multivibrators are labeled with the letters SS, etc. Since each of the units represented by the various blocks is well known in the art, only a brief general description of its function is given here.

Figure 8:
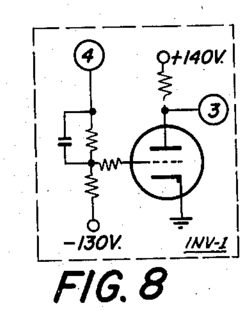

The INV–1 unit shown in FIG. 8 comprises an inverter having an input tap 4 and an output tap 3. This unit is utilized to invert the signal applied to the #4 tap in a conventional manner.

Figure 9:
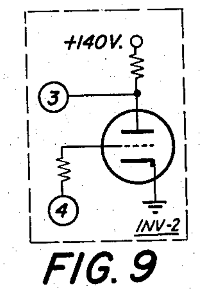
Figure 10:
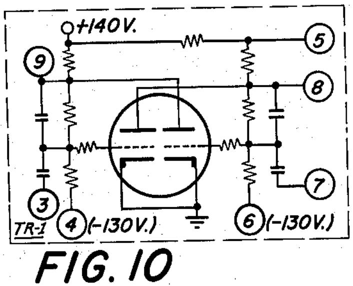

FIG. 9 discloses an INV–2 unit, also an inverter, having an input tap 4 and an output tap 3, and signals applied to the #4 tap are inverted by this unit when taken from the #3 tap thereof.

The TR–1 unit (FIG. 10), more commonly referred to as a trigger, is operated by the negative-going edges of pulses applied to either the #3 or #7 tap thereof. This results in reversing the condition of stability of the trigger if that portion of the tube associated with the tap subjected to the pulse was previously conducting. When operated, the output taps either drop or go up in potential depending upon the prior condition. Thus, output is taken from the #8 tap, the #9 tap or the #5 tap thereof, depending upon the polarity and amplitude desired. For convenience in referring to the condition of the various triggers utilized herein, a trigger will be referred to as "on" when the #5 and #8 taps are high, the #9 tap being low at this time, and as "off" when the opposite condition exists.

Figure 11:
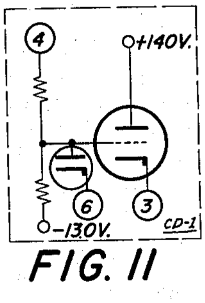

The CD–1 unit disclosed in FIG. 11, a cathode-diode gate, comprises a two-input "and" circuit having a cathode follower output. When both the #4 and #6 taps, i.e., the input taps, are high, the #3 or output tap goes up, this last mentioned tap being low if either the #4 or #6 tap is low.

Figure 12:
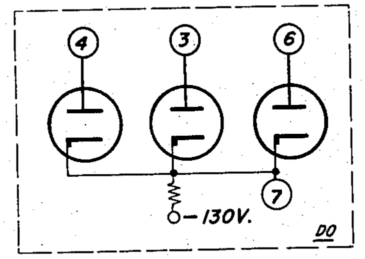

Referring now to FIG. 12, a three-input "or" circuit is disclosed. This unit, identified as a DO unit, is operated to cause the #7 tap to rise in potential if any one of the input taps 3, 4 or 6 goes up.

Figure 13:
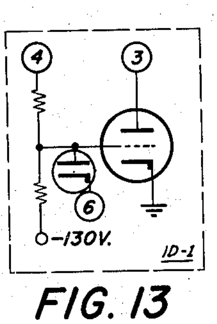

FIG. 13 discloses an ID–1 unit, an inverter diode gate, which unit is a two-input "and" circuit having an inverted output. Thus, when both the #4 and #6 taps are high, the #3 tap thereof drops, the #3 tap being high when either the #4 or #6 tap is low.

Figure 14:
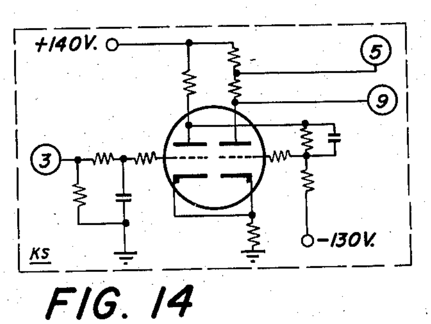

The KS unit shown in FIG. 14, commonly referred to as a "key Schmidt," is operated by placing a negative signal on the #3 tap thereof, which signal causes the #5 and #9 taps to rise for the duration of the signal, these last mentioned taps being normally low. This unit is normally operated by relay contacts and is designed to reduce detrimental effects resulting from contact bounce.

Figure 15:
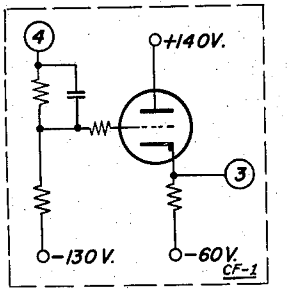

A CF–1 unit is disclosed in FIG. 15 which unit, as its symbol implies, is a cathode follower. Input signals applied to the #4 tap of this unit are taken in the same phase from the #3 tap thereof.

Figure 16:
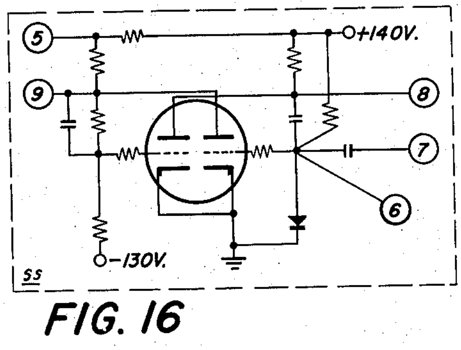

An SS unit is shown in FIG. 16, which unit has input taps 6 and 7 and output taps 5, 8 and 9. The normal condition of this unit is such that the #5 and #9 taps thereof are low. However, when a negative-going pulse is applied to the #6 or #7 tap, this condition is reversed for a period determined by the time constants of the circuit. Several such circuits are disclosed in the detailed circuitry of the invention and the period of each such unit will be pointed out in connection with the description of the particular unit involved.

Figure 17:
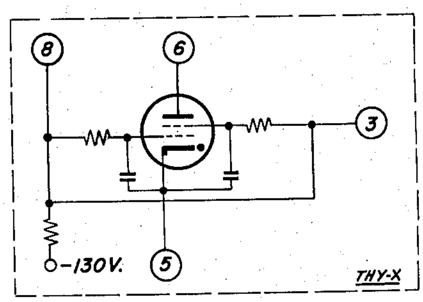

A THY–X unit is disclosed in FIG. 17, which unit is a thyratron utilized to operate a relay. The #3 and #8 taps of this unit are normally biased to maintain the tube cut off; however, when these taps are raised sufficiently, the tube will conduct, thereby causing the relay with which it is associated to become energized.

The circuitry shown in FIGS. 7*a* and 7*b* is disclosed for the purpose of illustrating the operation of the structure discussed above, and it should be clear that the invention is not limited to this circuitry or even to similar circuitry since many suitable circuits for operating the invention will be obvious to those with ordinary skill in the art. It should be noted, however, that the disclosed circuitry does provide for a novel mode of operation of the invention according to the distance the rack 18 is to be moved.

Referring now to FIG. 7*a*, means are provided for entering the address, i.e., the track number, of the desired track for controlling the positioning of the rack 18 according to the entered address. The means illustrated includes four manually operable switches 30, 31, 32 and 33, although in practice many forms of automatic address entry circuits will be readily apparent to those skilled in the art. The switches 30 and 32 each include two sets of contacts and corresponding armatures 34a, 34b and 35a, 35b, respectively. The switches 31 and 33 each include three sets of contacts together with corresponding armatures 36a, 36b, 36c and 37a, 37b, 37c. One address, which will be referred to hereinafter as address "one," is entered into switches 30 and 31 by manually positioning the armatures 34 and 36 at the positions corresponding to the desired address. Similarly, a second address, address "two," is entered into switches 32 and 33 by manually positioning the armatures 35 and 37 according to this address. Two pushbutton switches 38 and 39 are provided for controlling operation of the invention according to the addresses entered into the switches 30 through 33, the switch 38 being arranged to control the rack to seek the address defined by the switches 30 and 31 and the switch 39 being arranged to control the rack to seek the address defined by switches 32 and 33.

It is felt that the description of the circuitry may best be understood in connection with the description of its operation and for this reason it will be assumed that track address 37 has been entered into the switches 30 and 31, as indicated in the drawing by the position of the armatures of these switches, for controlling movement of the transducers to a position for cooperating with track 37. The positioning operation is initiated by operating switch 38 which causes a relay 40 (FIG. 7*b*) to be energized since a circuit is completed from ground through the armature 38b (FIG. 7*a*) of the switch 38, through the armature 41c of a switch 41 (the function of which will be described hereafter), through a line 42 to one side of the relay 40 (FIG. 7*b*). The other side of the relay 40 is connected through a switch 43, referred to as the "rack limit" switch, through a line 44, through the armature 41d (FIG. 7*a*) of the switch 41 and through a suitable voltage dropping resistor 45 to −200 volts. The rack limit switch 43 (FIG. 7*b*) is closed except when the rack is at its home position, i.e., except when the transducers are at the track address 00 (track 00 is the innermost track on the disc). Thus, unless the rack is in its home position, the switch 43 is closed and when the switch 38 is actuated the relay 40 is energized. The relay 40 is referred to as the "reset" relay since energization thereof controls the resetting of various circuits to be described and, in addition, causes each of the solenoids 24*a* through 24*e* to be energized, thereby picking the corresponding pawls 22*a* through 22*e*. This permits the pawls 22 to be maintained clear of the rack while the rack is being moved to its home position during the reset operation. One side of each of the solenoids 24 (FIG. 7*b*) is connected to +140 volts, the other sides thereof being connected through the corresponding one of several lines 46 through 50 and through the corresponding n/o contacts *d* through *h* of the relay 40 to ground. Thus, when the relay 40 picks, each of the solenoids 24 is energized since they are connected between ground and +140 volts at this time.

Additionally, as will be explained, the magnetic clutch 26 is energized when the relay 40 picks. One side of the clutch 26 is connected by a line 51, through the n/o *b* contacts of the relay 40 to −130 volts, the other side of the clutch 26 being connected by a line 52 to ground. Thus, when the relay 40 picks, as it does when the address "one" switch 38 (FIG. 7*a*) is actuated, the clutch is energized to drive the rack toward its home position. It should be noted that the line 42 (FIG. 7*b*) is connected through the n/o *a* contacts of the relay 40 to ground, thereby maintaining the relay 40 energized through its own contacts once it picks. In this way the relay 40 is held until the rack limit switch 43 opens, at which time the rack is in its home position, the relay 40 drops out, the clutch 26 is deenergized, and the solenoids 24 are deenergized, thereby permitting the pawls 22 to engage the rack teeth.

As mentioned above, operation of the switch 38 (FIG. 7*a*) controls reset of the apparatus, i.e., the various electronic circuits are reset and the mechanical components are returned to their home positions. After reset, the relay 40 (FIG. 7*b*) drops out, thereby connecting +40 volts to the #3 tap of a KS unit 55 since the #3 tap of this unit is connected by a line 56 through the n/c *i* contacts of the relay 40 and through a suitable voltage dropping resistor 57 to +140 volts. The line 56 is additionally connected through the n/o *i* contacts of the relay 40 to ground. Thus, while the relay 40 is energized, the #3 tap of the KS unit 55 is connected to ground, and when the relay 40 drops out this tap is connected to +40 volts. When this occurs, the #9 tap of the unit 55 rises sharply, thereby raising the potential of a line 58 as well as the #4 tap of an ID–1 unit 59 connected to the line 58. The #6 tap of the unit 59 is coupled to the output of a continuously operable square-wave generator 60 of suitable frequency, and while the #4 tap of the unit 59 is high, positive-going pulses appearing at the #6 tap thereof are taken from the #3 tap as negative-going pulses.

The #3 tap of the ID–1 unit 59 is connected by a line 61 to the #7 tap of each of two SS units 62 and 63 as well as to the #4 tap of an INV–1 unit 64. The SS units each comprise single-shot multivibrators, the unit 62 being arranged to provide negative-going 100 μs. (microsecond) pulses each time the #7 tap thereof drops and the SS unit 63 being arranged to provide negative-going 50 μs. pulses each time the #7 tap thereof drops.

The output tap of the SS unit 62 is connected by a line 65 to the #4 tap of an ID–1 unit 66, the #6 tap of which is connected by a line 67 to the #3 tap of a CF–1 unit 68. The #3 tap of the unit 68, a cathode follower, is high as long as the #4 tap is high. Since the #4 tap is connected by a line 69 to the #9 tap of a TR–1 unit 70 and since this unit is reset in an "off" condition when the relay 40 drops out, it will be clear that the #6 tap of the ID–1 unit 66 is high after reset and that negative-going 100 μs. pulses taken from the #8 tap of the SS unit 62 pass through the unit 66 to a line 71 connected to the #3 tap of the unit 66. The TR–1 unit 70 is reset to an "off" condition when the relay 40 operates since the #4 tap thereof is connected to a reset line 72 which is connected through the n/c *c* contacts of the relay 40 to −130 volts. When the relay 40 picks, these contacts are opened, the line 72 floats until the relay 40 drops out, and the unit 70 is set in an "off" condition. When the bias is restored to the #4 tap, the unit remains in the "off" condition.

The positive-going 100 μs. pulses taken from the #3 tap of the unit 66 are connected through the line 71 to the #7 tap of each of five TR–1 units 75 through 79, which units are connected in a conventional ring circuit. The #6 tap of the unit 75 is connected to the reset line 72, the #4 taps of the TR–1 units 76 through 79 being connected to this line, and it will now be clear that the unit 75 is reset in an "on" condition to render the #8 tap thereof initially high, and the units 76 through 79 are reset in an "off" condition to render the #8 taps thereof low initially. The negative-going edge of the first 100 μs. pulse to appear on the line 71, after reset, controls the unit 75 to switch to an "off" condition, i.e., controls the #5 and #8 taps thereof to drop in potential. When the #5 tap of the unit 75 drops, the unit 76 is turned on since the #5 tap of the unit 75 is connected to the #3 tap of the unit 76. Successive pulses cause successive triggers to be operated in a similar manner.

The #8 tap of each of the TR–1 units 75 through 79 is connected to the #4 tap of a corresponding CD–1 unit 81 through 85, the #3 taps of which are connected to the #4 taps of corresponding DO units 86 through 90. The #6 tap of each of the various CD–1 units 81 through 85 is connected to the line 67, the potential of which, it will be recalled, is controlled by the condition of the TR–1 unit 70. The condition of this unit is such that on reset the #9 tap, and thus the line 67, is high, thereby maintaining the #6 tap of each of the units 81 through 85 high until the unit 70 is turned on.

The #7 tap of each of the DO units 86 through 90 is connected through a corresponding INV–2 unit 91 through 95 to the control grid of a corresponding power triode 96 through 100, and when the #4 tap of one of the units 91 through 95 is high, the #3 tap, and thus the control grid of the corresponding power triode 96 through 100, is low, maintaining that triode in a cut-off condition.

The cathodes of the triodes 96 through 100 are connected to ground, the plates thereof being connected through the corresponding solenoids 24*a* through 24*e* to +140 volts, and it will be understood that when one or more of the triodes 96 through 100 is cut off the corresponding solenoid is deenergized. Similarly, when the tube is arranged to conduct, i.e., when the #3 tap of an INV–2 unit 91 through 95 is high, the associated solenoid 24*a* through 24*e* is energized.

It should now be clear that upon reset the #8 tap of the TR–1 unit 75 is high and since the #6 tap of the CD–1 unit 81 is also high at this time, the #3 tap of the unit 81 is high, thereby maintaining the #7 tap of the DO unit 86 as well as the #4 tap of the INV–2 unit 91 high. This results in cutting off the triode 96 and maintaining the solenoid 24*a* deenergized. This is the condition, it will be recalled, when the rack is in its home position. Since the #8 tap of each of the units 76 through 79 is low at this time, the corresponding triodes 97 through 100 are biased to conduct, thereby energizing the solenoids 24*b* through 24*e* associated therewith.

Normally the various TR–1 units 75 through 79 are driven in the order 75, 76, 77, etc., causing the solenoids 24*a* through 24*e* to be successively dropped out in that order. As discussed above, this controls the rack to escape four, i.e., *n*–1, tracks at a time. Means to be described are provided for controlling operation in this manner until the remaining increment of rack movement is less than four tracks, at which time the rack is controlled to escape to the desired track.

It will be recalled that the pulses which drive the units 75 through 79 pass through the ID–1 unit 66 as long as the #9 tap of the TR–1 unit 70 is high. This condition exists until the #6 tap of an ID–1 unit 101 goes up, at which time the 50 μs. pulses taken from the #8 tap of the unit 63 pass through the unit 101 to the #3 tap of the TR–1 unit 70. The trailing edge of the first positive-going 50 μs. pulse to be applied to the #3 tap of the unit 70 turns this unit on, thereby lowering the #9 tap thereof and raising the #8 tap. The #6 tap of the unit 101 is connected by a line 102 to the #3 tap of a DA unit 103 and, as will become clear, the #3 tap of the unit 103, and thus the line 102, is high when the #7 and #8 taps of the unit 103 are high. This occurs when the ring circuit comprising the units 75 through 79 and a ring circuit comprising five TR–1 units 105 through 109 are both in a condition corresponding to the setting of the switches 30 and 31. Before proceeding with this explanation, however, a brief description of the ring comprising the triggers 105 through 109 is deemed in order.

The #6 tap of the TR–1 unit 105 is connected to the reset line 72, the #4 taps of the units 106 through 109 being connected to this line. Thus, the unit 105 is reset to an "on" condition wherein the #8 tap thereof is initially high, the units 106 through 109 being reset in an "off" condition wherein the #8 taps thereof are low. The #5 and #3 taps of the various units 105 through 109 are connected in the manner discussed previously in connection with the ring circuit comprising the units 75 through 79. The #7 tap of each of the units 105 through 109 is connected by a line 110 to the #3 tap of an INV–2 unit 111 and since the #4 tap of the unit 111 is connected by a line 112 to the #3 tap of the CD–1 unit 81, it will be clear that each time, after reset, that the #3 tap of the unit 81 rises in potential, i.e., each time the TR–1 unit 75 is operated to raise the potential of the #8 tap thereof, the #3 tap of the unit 111, and thus the line 110, drops in potential, causing the "on" unit 105 through 109 to be turned off and thereby causing the next succeeding unit to be turned on. Since the #3 tap of the CD–1 unit 81 rises on the trailing edge of each fifth pulse generated by the SS unit 62 and passing through the ID–1 unit 66, it will be clear that the #8 tap of the TR–1 unit 106 rises on the trailing edge of the fifth such pulse, at which time the rack will have been moved 20 tracks. Similarly, on the trailing edge of the tenth such pulse the #8 tap of the unit 107 rises and at this time the rack will have been moved 40 tracks, etc.

The #8 tap of the DA unit 103 is connected by a line 113 through armature 34a of the switch 30 (FIG. 7*a*) to one of several lines 114 through 118 dependent upon the condition of the switch 30, which lines are connected through corresponding contacts of a relay 119 to the #3 tap of a corresponding one of five CF–1 units 120 through 124 (FIG. 7*b*). The units 120 through 124 are controlled by the TR–1 units 105 through 109 and when the #8 tap of one of the units 105 through 109 is high, the #3 tap of the corresponding CF–1 units 120 through 124 is high. Thus, while the rack 18 is in a position between tracks 00 and 20 the #3 tap of the unit 120 is high, thereby maintaining the line 114 high. Similarly, when the #8 tap of the unit 106 is high, the line 115 is high, etc. The line 113, therefore, is arranged to rise at a time determined both by the setting of the switch 30 (FIG. 7*a*) and by the condition of the ring circuit which includes the units 105 through 109 (FIG. 7*b*). Assuming that the switches 30 and 31 (FIG. 7*a*) are in the condition shown in the drawing, it will be clear that the line 113 goes up after the rack has been moved to track 20.

The #7 tap of the DA unit 103 (FIG. 7*b*) is connected by a line 125 through the armature 34b of the switch 30 (FIG. 7*a*) to one of two lines 126 or 127 dependent upon the condition of the switch 30. In the condition shown the line 125 is connected to the line 126, which line is connected through the armature 36b of the switch 31 to one of three lines 128, 129 or 130 dependent upon the condition of the switch 31. The line 127 is connected through the armature 36a of the switch 31 to one of two lines 131, 132 or to the line 128 under control of the position of the armature. The lines 128 through 132 are connected to the #3 taps of the corresponding CD–1 units 81 through 85 (FIG. 7*b*) through corresponding n/c contacts of the relay 119 (FIG. 7*a*). In the condition shown, therefore, the line 125, and thus the #7 tap of the DA unit 103 (FIG. 7*b*), is connected through the armature 34b (FIG. 7*a*), through the line 126, through the armature 36b, through the line 130, through the n/c *b* contacts of the relay 119 and through a line 135 to the #3 tap of the CD–1 unit 85 (FIG. 7*b*). Thus, in the present example, each time the TR–1 unit 79 is turned on, the line 125 rises. If the line 113 is also high, at it is after the ring comprising TR–1 units 75 through 79 has been operated five times, the line 102 goes up. The line 102 rises, therefore, on the trailing edge of the ninth 100 μs. pulse to pass through the ID–1 unit 66. Following this time, the 50 μs. pulses generated by the SS unit 63 pass through the ID–1 unit 101 and the trailing negative-going edge of the first such pulse turns the TR–1 unit 70 on, thereby lowering the line 67 and the #6 tap of the ID–1 unit 66 to prevent the passage of further 100 μs. pulses through this unit. Additionally, it should be noted that the #6 taps of the various CD–1 units 81 through 85 drop at this time, thereby causing energization of each of the solenoids except solenoid 24d, as will become clear.

When the potential of the #9 tap of the unit 70 drops, the #8 tap goes up. This tap is connected through a CF–1 unit 136 to the #6 tap of an ID–1 unit 137 by a line 138, which line is additionally connected through the n/c *a* contacts of the relay 119 (FIG. 7*a*), through a line 139 to the armature 36c of the switch 31, and through a line 139a to the #3 tap of the DO unit 89 (FIG. 7*b*), thereby causing the #7 tap of this unit to go up and causing the solenoid 24d to drop out. Thus, when the rack has been moved to track 36, the line 102 rises and all solenoids except the solenoid 24d are energized, thereby permitting the rack to escape one more track to track 37.

The #4 tap of the ID–1 unit 137 is connected by a line 140 to the #3 tap of the INV–1 unit 64 mentioned previously, the #4 tap of which, it will be recalled, is connected to the line 61. Thus, positive-going pulses generated by the square-wave generator 60 are applied to the #4 tap of the unit 137 at all times, except during reset, and when the #6 tap of the unit 137 rises as explained above, negative-going pulses are taken from the #3 tap and are applied to the #3 tap of a TR–1 unit 141. The #4 tap of the unit 141 is connected to the reset line 72, and thus this unit is reset in an "off" condition such that the #8 tap thereof is initially low. The first pulse to pass through the ID–1 unit 137, however, reverses this condition and causes the #8 tap of the unit 141 to go up. This occurs on the trailing edge of the 50 μs. pulse which follows the operation of the TR–1 unit 70, and since the #8 tap is connected through a CF–1 unit 142 to a line 143, which line is connected to the #6 tap of each of the DO units 86 through 90, the #7 tap of each of these DO units goes up at this time and causes all of the solenoids 24a through 24e to become deenergized. At this time, therefore, the transducers are in position adjacent track 37, which address was entered in the switches 30 and 31.

In order to reposition the rack and its associatel transducers manually to the next address, i.e., to the address entered in switches 32 and 33, the address "two" switch 39 (FIG. 7*a*) is operated. This causes the relay 40 to pick, as described above, thereby resetting the various electronic components, and additionally picks a relay 150. One side of the relay 150 is connected by a line 151 through the armature 41e of the switch 41, through a voltage dropping resistor 152 and through the armature 38a of the switch 38 to −200 volts, the other side of the relay 150 being connected through a line 153, through the armature 41$b$ of the switch 41 and through the armature 39$a$ of the switch 39 to ground. When the relay 150 picks, it is held through its $a$ contacts until the switch 38 is operated. It should also be noted in this connection that when relay 150 picks its $c$ contacts close, thereby energizing the relay 119 and placing the switches 32 and 33 in the electronic circuit. Upon completion of reset, relay 40 drops out and the rack is positioned to address "two" in a manner similar to that previously described.

Means for automatically sequencing address "one" and address "two" are provided, which means are operated under control of the switch 41 mentioned earlier. Assuming that the rack is positioned at the address designated by the appropriate switches 30, 31 or 32, 33, the line 143 is high. (It will be clear that the rack will always seek a track address as long as the square-wave generator 60 is functioning until it reaches the desired track.) The switch 41 is referred to as a "manual/automatic switch," and when it is switched to the automatic position shown in phantom lines in FIG. 7$a$, the line 143 is connected through the armature 41$f$ to the #4 tap of an INV–2 unit 155. The #3 tap of this unit is connected to the #7 tap of an SS unit 156, and since the line 143 is high as described above, operation of the switch 41 causes the #7 tap of the SS unit 156 to drop, thereby controlling this unit to operate. This unit is utilized to provide a 15 ms. (millisecond) delay and the positive-going 15 ms. pulse generated thereby and taken from the #5 tap thereof is connected to the #3 and #7 taps of a TR–1 unit 157 as well as to the #4 tap of an INV–1 unit 158.

The unit 157 determines the condition of the address select relay 119 since the #8 tap thereof is connected through a CF unit 159 and through the armature 41$b$ of the switch 41 to the line 153. When the #8 tap of the unit 157 is high, therefore, the relay 150, and thus the relay 119, is energized. When, however, the #8 tap of the unit 157 is low, the relays 150 and 119 remain deenergized. The trailing edge of each pulse generated by the SS unit 156, therefore, causes the TR–1 unit 157 to reverse its condition, thereby controlling energization or deenergization of the relay 119.

It was mentioned above that the #5 tap of the SS unit 156 is additionally connected to the #4 tap of an INV–1 unit 158. The #3 tap of this last mentioned unit is coupled to both the #8 and #3 taps of a THY–X unit 160, the #6 tap of which is connected through the armature 41$d$ of the switch 41 to the line 44. Thus, when the THY–X unit 160 is conductive, the relay 40 (FIG. 7$b$) is energized. The THY–X unit 160 (FIG. 7$a$) is biased below cutoff, however. When a positive pulse is applied to the #3 and #8 taps of this unit, it will conduct provided that the contacts 43 (FIG. 7$b$) are closed. Thus, at the end of the 15 ms. period, i.e., on the trailing edge of the pulse generated by the SS unit 156 (FIG. 7$a$), the #3 tap of the INV–1 unit 158 rises and, since this tap is capacitively coupled to the #3 and #8 taps of the unit 160, the unit 160 is rendered conductive, thereby energizing the relay 40 and controlling reset as described previously. After reset is accomplished, i.e., when the contacts 43 reopen, the rack is controlled to seek the address in the switches determined by the condition of the TR–1 unit 157, as described previously. Upon reaching this address, the line 143 again rises, thereby again firing the SS unit 156 which, after the 15 ms. delay period, causes reset and additionally causes the rack to seek the next address.

The control circuitry described above has been disclosed as being associated with only one of the many positioning devices of the invention shown in the storage device of FIG. 1. It will be clear, however, that control circuitry such as this may readily be adapted to selective control of many such devices by utilizing suitable switching mechanisms, and it is not necessary to provide a separate control circuit for each positioning device utilized.

For example, suitable electronic or mechanical switching may be provided to switch selected sets of solenoids 24 into or out of the circuit, and in this way a single control circuit may operate any number of positioning devices.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A device for selectively positioning a rack to one of a plurality of equally spaced rack positions separated by a distance $s$ comprising a rack having a plurality of teeth, means for moving said rack in a first direction along a path longitudinally thereof, a plurality of $n$ pawls supported adjacent said rack for selectively engaging said teeth, said teeth being spaced apart a distance equal to $n \times s$ and said pawls being spaced apart a distance equal to $s(n+1)$, register means settable according to a selected rack position, operating means for engaging and disengaging said pawls with said rack in a predetermined sequence for permitting successive escapements thereof equal to a distance of $s(n-1)$, said operating means including counting means for counting the number of said escapements, means under control of said register means and said counting means for rendering the sequential operation of said operating means inoperative when the distance remaining to be moved by said rack to said selected rack position is less than $s(n-1)$, and means for disengaging all but a selected one of said pawls with said rack under control of said register means when said sequential operation is terminated for permitting a further escapement of said rack equal to said remaining distance, whereby said rack is positioned to said selected rack position.

2. A device for selectively positioning a rack to one of a plurality of equally spaced rack positions separated by a distance $s$ comprising a rack having a plurality of teeth, means for moving said rack in a first direction along a path longitudinally thereof, a plurality of $n$ pawls supported adjacent said rack for selectively engaging said teeth, said teeth being spaced apart a distance equal to $n \times s$ and said pawls being spaced apart a distance equal to $s(n+1)$, register means settable according to a selected rack position, operating means for engaging and disengaging said pawls with said racks in a predetermined sequence for permitting successive escapements thereof equal to a distance of $s(n-1)$, and control means operative for rendering the sequential operation of said operating means inoperative when the distance remaining to be moved by said rack to said selected rack position is less than $s(n-1)$, said control means being operative in response to a correlation between said register means and said counting means, said control means being additionally adapted to control engagement of a selected one only of said pawls with said rack after said sequential operation is terminated for permitting a further escapement of said rack equal to said remaining distance, whereby said rack is positioned at said selected rack position.

3. A device for selectively positioning a rack to one of a plurality of equally spaced rack positions separated by a distance $s$ comprising a rack having a plurality of teeth, means for moving said rack from a first position in a first direction along a path longitudinally thereof, a plurality of $n$ pawls supported adjacent said rack along said path for selectively engaging said teeth, said teeth being spaced apart a distance equal to $n \times s$ and said pawls being spaced apart a distance equal to $s(n+1)$, register means settable according to a second rack position spaced from said first position by a distance D, operating means for sequentially engaging and disengaging said pawls with said rack in a predetermined sequence for permitting successive escapements thereof equal to a distance of $s(n-1)$, said operating means including means for counting the number of said escapements, means under control of said register means and said counting means for rendering the sequential operation of said operating means inoperative when the difference between D and the product of the number of said escapements and $s(n-1)$ is less than $s(n-1)$, and means for controlling said operating means for further engaging a selected one of said pawls with said rack under control of said register means and said counting means for permitting a further escapement of said rack equal to the difference between D and the product of the number of said escapements and $s(n-1)$, whereby said rack is moved from said first position to said second position.

4. A device for selectively positioning a rack to a selected one of a plurality of equally spaced rack positions separated by a distance $s$ comprising a rack having a plurality of teeth, means for supporting said rack for movement in a first direction along a path disposed longitudinally thereof, means for moving said rack from a first position along said path in said first direction, a plurality of $n$ pawls supported adjacent said rack along said path for engaging said teeth to resist movement of said rack in said first direction, said teeth being spaced apart a distance equal to $n \times s$ and said pawls being spaced apart a distance equal to $s(n+1)$, register means for indicating a selected rack position, operating means for engaging only one of said pawls with said rack at a time, said operating means being controlled to successively engage adjacent ones of said pawls with said rack in an order corresponding to a direction opposite to said first direction to permit successive escapements equal to $s(n-1)$, said operating means including means for counting the number of said escapements for providing an indication of the distance said rack is moved from said first position, means under control of said register means and said counting means for rendering the sequential operation of said operating means inoperative when the distance remaining to be moved by said rack to said selected rack position is less than $s(n-1)$, and means for disengaging all but a selected one of said pawls with said rack under control of said register means when said sequential operation is terminated for permitting a further escapement of said rack equal to said remaining distance, whereby said rack is positioned to said selected rack position.

5. A device for selectively positioning a rack to one of a plurality of equally spaced rack positions separated by a distance $s$ comprising a rack having a plurality of teeth, means for moving said rack in a first direction along a path longitudinally thereof, a plurality of $n$ pawls supported adjacent said rack for selectively engaging said teeth, said teeth being spaced apart a distance equal to $n \times s$ and said pawls being spaced apart a distance equal to $s(n+1)$, operating means for engaging and disengaging said pawls with said rack in a predetermined sequence for effecting escapements thereof equal to a distance of $s(n-1)$, means for rendering said predetermined sequential operation of said operating means inoperative when the distance remaining to be moved by said rack to said selected rack position is less than $s(n-1)$ and for engaging but a selected one of said pawls with said rack for effecting further escapement of said rack equal to said remaining distance.

References Cited in the file of this patent

UNITED STATES PATENTS

| | | |
|---|---|---|
| 484,360 | Gawley | Oct. 11, 1892 |
| 2,086,798 | Greenberg | July 13, 1937 |
| 2,123,978 | Wagner | July 19, 1938 |
| 2,362,275 | Jacobs | Nov. 7, 1944 |
| 2,410,708 | Breither et al. | Nov. 5, 1946 |
| 2,674,728 | Potter | Apr. 6, 1954 |
| 2,690,913 | Rabinow | Oct. 5, 1954 |
| 2,792,720 | Roesch | May 21, 1957 |
| 2,819,360 | Martin | Jan. 7, 1958 |
| 2,832,841 | Eldridge | Apr. 29, 1958 |
| 2,925,238 | Lynott | Feb. 16, 1960 |